United States Patent [19]

Weinhaus et al.

[11] 4,129,950
[45] Dec. 19, 1978

[54] WHEEL GAUGE

[75] Inventors: Theodore Weinhaus, 7 Heartwoods, St. Louis, Mo. 63132; Allen Fischer, St. Louis, Mo.

[73] Assignee: Theodore Weinhaus, St. Louis, Mo.

[21] Appl. No.: 818,448

[22] Filed: Jul. 25, 1977

[51] Int. Cl.² .................................................. G01B 5/08
[52] U.S. Cl. .............................. 33/178 R; 33/180 AT
[58] Field of Search .......... 33/178 R, 180 AT, 178 B, 33/168 R, 203, 143 D

[56] References Cited

U.S. PATENT DOCUMENTS

| 1,786,638 | 12/1930 | Wadell | 33/180 AT |
| 1,898,136 | 2/1933 | Miller et al. | 33/180 AT |
| 3,422,541 | 1/1969 | Ott | 33/178 B |

*Primary Examiner*—Richard E. Aegerter
*Assistant Examiner*—Willis Little
*Attorney, Agent, or Firm*—Cohn, Powell & Hind

[57] ABSTRACT

This wheel gauge is for use in obtaining primary measurement data of an unidentified automobile wheel and includes a hub opening indicator, a bolt circle diameter indicator and a rim diameter indicator. The gauge includes a base plate and the hub opening indicator is provided by stepped elements mounted to the base plate and selectively insertable into the hub opening; the bolt circle indicator is provided by a sliding element mounted to the base plate and having a transverse plunger receivable into the bolt openings, and the rim indicator is provided by a movable element mounted to the base plate and movable into engagement with the wheel rim.

A modified device includes a plurality of components each having a base including a reduced portion providing a hub opening indicator and an offset portion providing a bolt circle indicator said portions being insertable into the hub and bolt openings respectively. A separate movable portion is slidingly mountable to each base portion and movable into engagement with the wheel rim to provide a wheel rim indicator.

10 Claims, 7 Drawing Figures

U.S. Patent  Dec. 19, 1978  Sheet 2 of 2  4,129,950
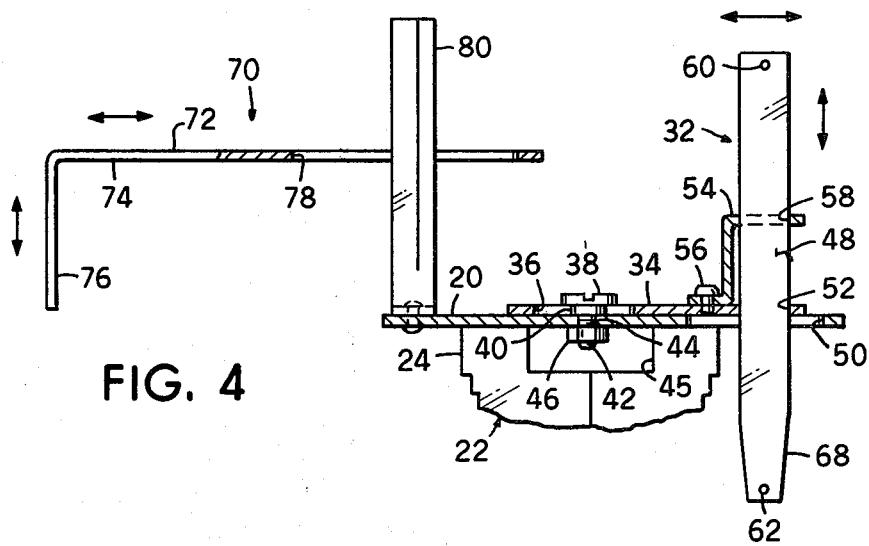
FIG. 4
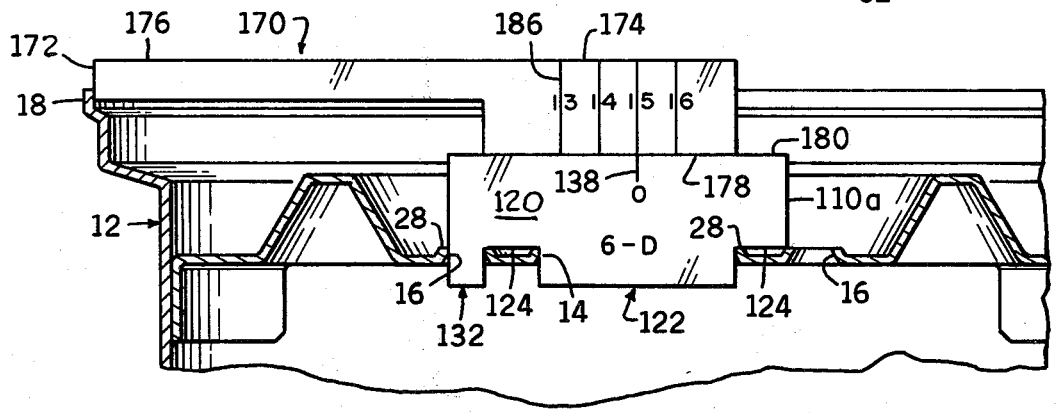
FIG. 6
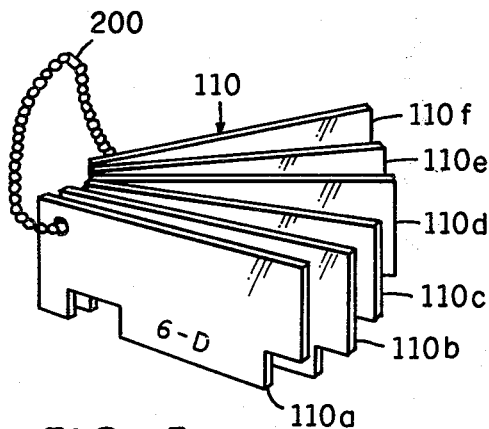
FIG. 5
| Wheel | Automobile | Model |
|---|---|---|
| 6-D-15-4 | GM Impala<br>Belair<br>Caprice<br>Ford LTD<br>Mercury<br>Lincoln | 71-76<br><br><br>73-76 |
| 1-A-13-4 | GM Vega<br>Astra<br>Monza<br>Skyhawk<br>Starfire | All |
FIG. 7

WHEEL GAUGE

BACKGROUND OF THE INVENTION

This invention relates generally to wheel measuring devices and particularly to a wheel gauge for measuring wheel dimensions to permit identification of otherwise unidentifiable wheels.

As is well known in the automotive industry the wheel sizes of various makes of automobile are not always peculiar to a particular model of automobile, but are frequently interchangeable with other models. In fact, some wheels will fit a number of different models, and even models of different makes of automobiles.

This is important in the used automotive parts business because, as will readily be recognized, the cost differential between a used and a new wheel is considerable and many customers, particularly those with older cars, wish to take advantage of the saving. However, one of the problems facing the used automotive parts business is the difficulty of identifying, from a stock of unmarked used wheels, a wheel which will be suitable for a particular model of automobile.

Wheels vary primarily with respect to the diameter of the hub opening, the bolt circle diameter and the number of bolts, and the diameter of the wheel rim. Obviously, all of these data must be known if a suitable wheel is to be provided. However, there is no known gauge which will permit unidentified wheels to be measured for rapid comparison with an existing wheel and the problem is even more acute in those instances in which all of a customer's wheels have been stolen and all that is known is the make and model of his automobile.

The present wheel measuring gauge solves these and other problems in a manner not disclosed in the known prior art.

SUMMARY OF THE INVENTION

This wheel gauge provides a means of rapidly measuring the primary dimensions of unidentified wheels so that a wheel can be classified according to the various models of automobiles with which it can be used.

The gauge provides a means of measuring the hub opening diameter, the bolt opening circle diameter and the rim diameter of a wheel so that the measured data can be compared with a simple coded chart bearing identification data whereby the wheels can be inventoried with respect to the automobile models for which they are suitable.

This wheel gauge includes a base; a hub opening diameter indicator means attached to the base and adapted to interfit a selected hub opening; a bolt circle diameter indicator means attached to the base and adapted to interfit a selected bolt opening; and a rim diameter indicator means, which is movably related to the base and is provided with a remote end adapted to engage a wheel rim.

The hub indicator means includes a plurality of opposed stepped elements arranged in depending, diametrically decreasing order, the elements including reference indicia related to the corresponding hub opening size.

The bolt circle diameter indicator means includes a sliding element mounted in movable relation to the base, and having a plunger element mounted in sliding relation transversely of the sliding element. The base and sliding element include associated reference indicia related to the corresponding bolt circle diameter when the plunger is received in a bolt opening.

The rim indicator means includes an elongate element movably mounted to the base for engagement of the remote end thereof with the wheel rim. The base and elongate elements include related reference indicia for measuring the wheel diameter.

The base includes a plate carrying a guide pin and having a slot spaced from the guide pin to receive the plunger in guided relation; and the sliding element includes a slot receiving the pin in guided relation.

The base plate includes a transverse guide post and the rim indicator elongate element includes a lengthwise extending slot receiving said guide post in guided relation.

A modified wheel gauge is provided which includes a set of plate components. Each component includes a base having a depending hub diameter indicator portion and an offset, bolt circle diameter opening indicator portion receivable within the hub opening and bolt opening respectively. The gauge also includes an elongate rim diameter indicator element, which is movably mountable to the plate components and is adapted to engage said wheel rim, said element and said base plate components including associated reference indicia alignably related to indicate the rim diameter. Each of the component plates is identified with coded indicia related to a hub diameter and bolt circle diameter.

A method is disclosed whereby the primary dimensions of an unidentified wheel may be measured for classification and comparison with a chart containing coded representation of the automobiles for which the wheel is suited.

These wheel gauges are relatively inexpensive to manufacture and can be readily used by an operator with relatively little training.

BRIEF DESCRIPTION OF THE DRAWINGS

FIG. 4 is a fragmentary cross sectional view of the gauge taken on line 4—4 of FIG. 2;

FIG. 5 is a perspective view of the modified wheel gauge;

FIG. 6 is an elevational view of the modified gauge in an operational position; and FIG. 7 is a representation of a comparison chart for wheel sizes and related automobiles.

DESCRIPTION OF THE PREFERRED EMBODIMENTS

Figure 2:
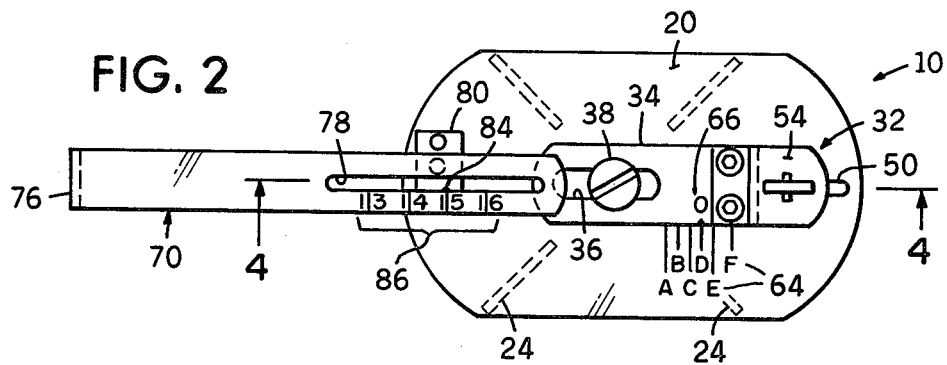
FIG. 2 is a top plan view of the gauge.

Referring now by reference numerals to the drawings and first to FIGS. 1 through 4, it will be understood that the wheel gauge is indicated by numeral 10 and is used for measuring the dimensional properties of a conventional automobile wheel such as that indicated by numeral 12. The gauge 10 is capable of measuring the wheel hub opening diameter, indicated by numeral 14; the bolt circle diameter of the bolt openings 16 and the diameter of the wheel rim 18. The component parts of the device will now be described specifically.

The wheel gauge 10 includes a flat plate 20 providing a base means for the hub opening diameter indicator means, the bolt circle diameter indicator means and the rim diameter indicator means.

The hub opening indicator means, generally indicated by numeral 22 includes four quadrant plates 24 which, in the preferred embodiment, are provided by a pair of perpendicularly related plates, welded or otherwise attached to the underside of the base plate 20. As clearly shown in FIG. 1 each quadrant plate 24 includes a plurality of steps 26a through 26k which are selectively receivable within the hub opening 14 and engage the margin 28 of said hub opening. Each step is provided with appropriate reference indicia adjacent thereto, collectively indicated by numeral 30, which provide the user with a visual indication of the size of the hub opening of the associated wheel 12.

The bolt circle indicator means, generally indicated by numeral 32, consists essentially of a sliding plate 34 having a slot 36 at one end. As best shown in FIG. 4, the slot 36 receives a set screw 38 having a reduced portion 40 received by the slot 36 to permit sliding of the sliding plate 34 in a fore and aft direction, thereby providing a guide pin for said sliding plate. The set screw 38 includes a threaded portion 42 received by an aperture 44 provided in the base plate 20 said set screw 38 being attached to said base plate by means of a nut 46. It will be understood that the quadrant plates 24 are cut away at the upper end to define an opening 45 providing clearance for the set screw 38. As also best shown in FIG. 4, the bolt circle indicator means includes a flat plate 48, which constitutes a plunger means, and is received in sliding relation within an elongate slot 50 provided in the base plate 20. The plunger plate 48 is received in sliding relation within an opening 52 provided in the sliding plate 34. The plunger plate 48 is stabilized for movement in a direction perpendicular to the base plate 20 by means of a generally inverted L-shaped support plate 54, which is attached to the sliding plate 34 as by fasteners 56, said support plate being provided with an opening 58 superjacently aligned with said sliding plate opening 52 and said plunger plate includes upper and lower stop elements 60 and 62 which provide limit means for the sliding movement of the plunger plate 48 within said aligned openings 58 and 52 and the base plate slot 50. The set screw 38 and plunger plate 48 cooperate with said base plate slots 36 and 50 respectively to guide the sliding plate 34 along a predetermined path. As clearly shown in FIG. 2 the base plate 20 includes a plurality of fixed reference indicia A, B, C, D, E and F and the sliding plate 34 includes a fixed reference marker indicated by numeral 66. It will be understood that this arrangement of parts permits the sliding plate to be moved lengthwise of the base plate 20 until the plunger plate 48 is approximately above the wheel bolt opening 16. When this rough alignment is achieved the plunger plate is depressed and the tapered end 68 thereof moves into engagement with the margin 70 of said bolt opening which accurately positions the reference marker 66 into alignment with one of the coded reference indicia, for example reference letter D which corresponds to a specific bolt circle diameter.

The rim diameter indicator means is generally indicated by numeral 70 and includes an L-shaped member 72 having an elongate leg 74 and short depending leg 76 engageable with the wheel rim 18. As best shown in FIG. 4, the elongate leg 76 includes a slot 78 which is received in sliding relation with a flat perpendicular post 80 fixedly attached to the base plate 20 as by fasteners 82. The post element 80 includes an elongate fixed reference mark 84 and the elongate leg 74, as best shown in FIG. 2, includes reference indicia collectively indicated by numeral 86. It will be understood that the sliding member 72 is moved relative to the post 80 until the short leg 76 engages the wheel rim 18 at which time one of the reference indicia, for example numeral 15, is aligned with the marker line 84 to provide the user with a visual indication of the rim diameter.

It is thought that the structural features of this wheel gauge have become fully apparent from the foregoing description of parts but for completeness of disclosure the use of the gauge will be briefly described.

Initially, the quadrants 24 of the hub opening indicator means 22 (FIG. 1) are inserted into the hub opening 14 until one of the steps, e.g. step 26f, prevents further insertion of said quadrants. Next, with the plunger plate 48 in the upper position shown in phantom outline in FIG. 1, the sliding plate 34 of the bolt circle indicator means 32 is moved radially outwardly from the set screw 38 into approximate alignment with the wheel bolt opening 16 and the plunger depressed until the tapered portion 68 enters the bolt opening 16 and accurately aligns the sliding plate reference marker 66 with the corresponding reference indicia on the base plate 20 (FIG. 2). Finally, the L-shaped element 72 of the rim indicator means 70 is placed in position with the slot 78 and moved into engagement with the rim 18. It will be understood that the length of the post 80 provides the L-shaped element with a certain amount of vertical latitude and brings it clear of the base plate 20.

Figure 1:
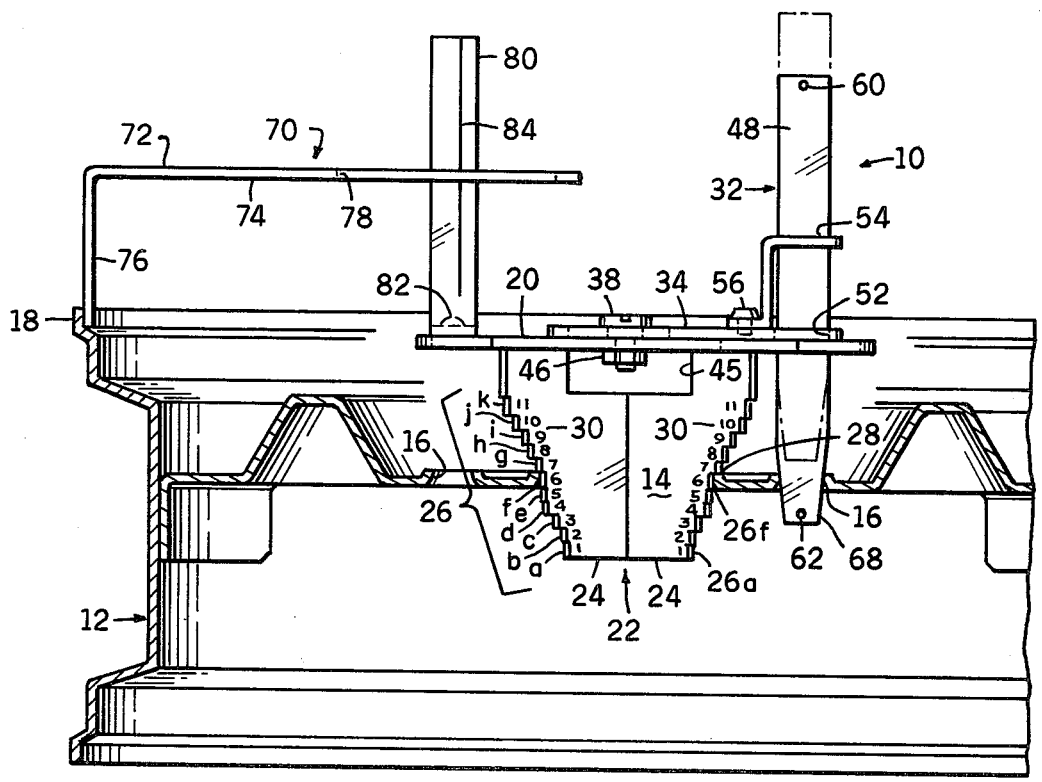
FIG. 1 is an elevational view of the wheel gauge in an operational position.
Figure 3:
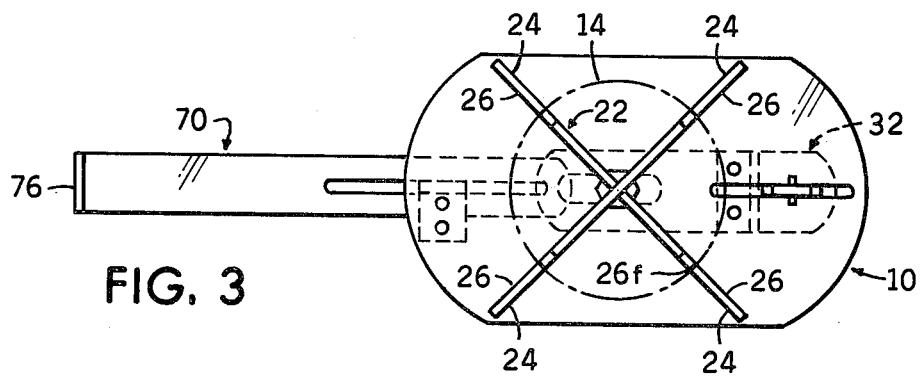
FIG. 3 is a plan view of the underside of the gauge.

When the gauge is operationally set up as shown in FIGS. 1 and 2 the user can readily observe the hub indicia, the bolt circle indicia and the rim indicia corresponding to the wheel 12: ie "6", "D" and "15" respectively. The indicia are noted and recorded, together with the number of wheel bolts eg 4. The recorded data is 6-D-15-4. This data is then compared with a comparison chart of known automobile wheel sizes, see FIG. 7, to indicate for which automobile models the wheel is suitable. The wheel can then be marked and placed in inventory.

The modified wheel gauge shown in FIGS. 5 and 6 and generally indicated by numeral 110 is used for the same purpose as that described above. In effect, gauge 110 provides a gauge set consisting of a plurality of plate components eg 110a through 110f. The components 110a through 110f are, in the preferred embodiment connected together as by a chain 200. Said components are substantially similar to each other in overall configuration but differ with respect to specific dimensions. For convenience the components will be described with respect to component 110a used with the same wheel 12, as was used to describe the previous embodiment, said wheel 12 as shown in FIG. 6 having a hub opening 14, bolt openings 16 and a wheel rim 18.

The gauge component 110a includes an upper portion 120, constituting a base means. A hub indicator means is provided by a depending portion 122 of reduced size which is symmetrically disposed about a reference marker 138 defining the axis of the hub opening. A bolt circle indicator means is provided by an offset depending portion 132 which is disposed a predetermined distance from the marker 138 and interfits the corresponding bolt opening 16, it being understood that recessed portions 124 engage the margin 28 of the hub opening and the margin 70 of the bolt opening respectively to seat the component 110a. The rim indicator means is provided by an elongate plate generally indicated by numeral 170 which includes a body portion 172 and an arm portion 174 having a remote end 176 which engages the rim 18. The body portion 172 is provided with a flat lower edge 178 which engages a corresponding flat edge 180 on the upper portion 120, and said body portion 172 includes reference indicia, collectively indicated by numeral 186, which is alignable with the reference marker 138 on the upper portion 120.

It will be understood that in use a gauge component is selected from the set by trial and error until a component is found having a hub indicator means 122 and bolt circle indicator means 132 which correspond to the particular wheel. It is then a simple matter to place the edges 138 and 180 of the rim indicator body 172 and the upper portion 120 into sliding relation and move the elements until the rim 18 is engaged by remote end. At this time the indicia can be observed and noted as before. In the example shown, using the component 110a, the size of the hub is represented by numeral "6", the bolt circle by letter "D" and the rim diameter by numeral "15". The number of bolt openings can then be counted resulting in the coded format 6-D-15-4 which can be read against the comparison chart, shown in FIG. 7, as before.

We claim as our invention:

1. A wheel gauge comprising:
   (a) base means,
   (b) hub opening diameter indicator means attached to the base means and adapted to axially interfit a selected hub opening and including reference means indicating the diameter thereof, and
   (c) bolt circle diameter indicator means attached to the base means and adapted to axially interfit a selected wheel bolt opening while the hub opening indicator means is in position, and including reference means indicating the bolt circle diameter thereof.

2. A wheel gauge as defined in claim 1, in which:
   (d) the base means includes rim diameter reference means, and
   (e) rim diameter indicator means is provided movably related to the base means and having a remote end adapted to engage the wheel rim said indicator means including corresponding reference means alignably related to the base reference means to indicate the rim diameter said rim diameter indicator means being independent of the bolt circle diameter indicator means.

3. A wheel gauge comprising:
   (a) base means,
   (b) hub opening diameter indicator means attached to the base means and adapted to interfit a selected hub opening,
   (c) bolt circle diameter indicator means attached to the base means and adapted to interfit a selected wheel bolt opening, and
   (d) the hub diameter indicator means including a plurality of steps disposed in fixed relation to each other and arranged in depending diametrically decreasing order.

4. A wheel gauge as defined in claim 3, in which:
   (e) said hub diameter indicator means including reference indicia disposed adjacent each step relating to the diameter of associated hub openings.

5. A wheel gauge comprising:
   (a) base means,
   (b) hub opening diameter indicator means attached to the base means and adapted to interfit a selected hub opening,
   (c) bolt circle diameter indicator means attached to the base means and adapted to interfit a selected wheel bolt opening, and
   (d) said bolt circle diameter indicator means including a sliding means mounted in movable relation to the base means and a plunger means mounted in sliding relation transversely of said sliding means to interfit said bolt opening.

6. A wheel gauge as defined in claim 5, in which:
   (e) the base means includes bolt circle diameter reference means,
   (f) the sliding means includes corresponding reference means movably related to the base reference means, and
   (g) one of said base means and sliding means includes a slot and the other of said means includes a guide pin received by the slot.

7. A wheel gauge as defined in claim 5, in which:
   (e) said base means includes a plate having a guide pin and a slot having a portion spaced from said guide pin and receiving said plunger means in guiding relation, and
   (f) said sliding means includes a slot receiving said guide pin in guiding relation and said sliding means also includes upper and lower portions each having an opening receiving said plunger means transversely in guiding relation.

8. A wheel gauge as defined in claim 7, in which:
   (g) said base means includes a transverse guide post means, and
   (h) an elongate rim diameter indicator means is provided including a lengthwise extending slot receiving said guide post means in guiding relation said rim diameter indicator means having a remote end adapted to engage the wheel rim.

9. A wheel gauge comprising:
   (a) a plurality of components each component including:
      (1) base means,
      (2) a depending hub diameter indicator means having a transverse axis said indicator means being carried by the base means and being adapted to axially interfit a selected hub opening axially disposed about said transverse axis, and
      (3) a depending bolt circle diameter indicator means carried by the base means and disposed in fixed spaced relation from said transverse axis and adapted to axially interfit a selected bolt circle opening while the hub diameter indicator means is in position.

10. A wheel gauge as defined in claim 9, in which:
   (b) the transverse axis of the base means is defined by a reference marker, and
   (c) an elongate rim diameter indicator means is provided movably related to the base means and having a remote end adapted to engage the wheel rim, said rim diameter indicator means including reference indicia alignably related to the reference marker to indicate the wheel rim diameter.

* * * * *